United States Patent
Park et al.

(10) Patent No.: US 7,205,936 B2
(45) Date of Patent: Apr. 17, 2007

(54) TRANSMITTING AND RECEIVING APPARATUS AND METHOD IN ADAPTIVE ARRAY ANTENNA SYSTEM CAPABLE OF REAL-TIME ERROR CALIBRATION

(75) Inventors: Hyeong-Geun Park, Pohang (KR); Seung-Chan Bang, Daejeon (KR); Soo-Bum Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 151 days.

(21) Appl. No.: 10/974,272

(22) Filed: Oct. 26, 2004

(65) Prior Publication Data

US 2005/0140546 A1    Jun. 30, 2005

(30) Foreign Application Priority Data

Dec. 27, 2003   (KR)   .................. 10-2003-0098219

(51) Int. Cl.
*H01Q 3/26*   (2006.01)
*G01S 7/40*   (2006.01)

(52) U.S. Cl. ...................... 342/368; 342/174
(58) Field of Classification Search ............... 342/368
See application file for complete search history.

(56) References Cited

U.S. PATENT DOCUMENTS

| | | | |
|---|---|---|---|
| 5,248,982 A | | 9/1993 | Reinhardt et al. |
| 5,530,449 A | | 6/1996 | Wachs et al. |
| 6,157,343 A | * | 12/2000 | Andersson et al. .......... 342/371 |
| 6,480,153 B1 | * | 11/2002 | Jung et al. ................... 342/368 |
| 2002/0057660 A1 | * | 5/2002 | Park et al. ................... 370/335 |
| 2004/0070533 A1 | * | 4/2004 | Azuma ........................ 342/174 |

FOREIGN PATENT DOCUMENTS

KR    1020030034259 A    5/2003

\* cited by examiner

*Primary Examiner*—Gregory C. Issing
(74) *Attorney, Agent, or Firm*—Blakely Sokoloff Taylor & Zafman

(57) ABSTRACT

Disclosed are a transmitting and receiving apparatus and method in an adaptive array antenna system capable of real-time calibration. Transfer functions in the transmitting and receiving apparatus are estimated by injecting a calibration signal to each of transmit and receive channels and analyzing the signals that has passed through the transmit and receive channels. An RF CW sinusoidal signal of a single frequency can be used as the calibration signal to simplify a process of signal processing in a baseband. In addition, in the calibration of the receiving apparatus, gains of all receive channels are controlled using an identical signal. Thus, a relative transfer function characteristic of the receive channels is constant irrespective of the gains of the receivers.

17 Claims, 9 Drawing Sheets

TRANSMITTING AND RECEIVING APPARATUS AND METHOD IN ADAPTIVE ARRAY ANTENNA SYSTEM CAPABLE OF REAL-TIME ERROR CALIBRATION

CROSS REFERENCE TO RELATED APPLICATION

This application is based on Korea Patent Application No. 2003-98219 filed on Dec. 27, 2003 in the Korean Intellectual Property Office, the content of which is incorporated herein by reference.

BACKGROUND OF THE INVENTION (a) Field of the Invention

The present invention relates to an adaptive array antenna system for a mobile communication base station. More specifically, the present invention relates to a transmitting and receiving apparatus and method in an adaptive array antenna system capable of real-time RF calibration required when a mobile communication base station system forms a digital beam.

(b) Description of the Related Art

In general, an adaptive array antenna system that adaptively directs an antenna beam in a desired direction using an array antenna in a mobile communication system can increase an antenna gain to improve a signal-to-noise ratio. In the case where a plurality of users exist in the same band, for example, in the case of a mobile communication base station system, the users can form independent antenna beams to reduce interference among the users by employing a smart antenna system.

The smart antenna system forms an antenna beam in an RF band using an analog device, or converts an RF signal to a baseband signal and then forms a digital antenna beam. The method of forming the digital antenna beam is more popular than the analog method because it can easily generate a beam pattern.

The digital method down-converts an RF signal received through an array antenna to a digital signal using an independent receiver, and then changes the amplitude and phase of the digital signal to form a digital beam. Accordingly, in order to accurately control a direction in the baseband, a relative amplitude and phase of the RF signal in an array antenna stage must be maintained in the baseband. However, an actual array receiving system has different amplitude and phase transfer functions for each array channel because of analog device characteristics comprising the receiver and other causes. Thus, a function of periodically measuring and compensating the different transfer functions is required, which is called RF calibration for an array receiver. The same concept is applied to RF calibration for an array transmitter.

The RF calibration requires a process for estimating a transfer function of an array receiver. The transfer function of the array receiver is varied depending on a state of an automatic gain controller as well as surrounding environments such as temperature, humidity, and so on. Thus, the transfer function should be periodically measured and calibrated when the array receiver is operated, which is called real-time calibration. While the temperature and humidity are slowly varied with time, a gain of the array receiver is determined by a time constant of the automatic gain controller. Accordingly, the transfer function must be estimated at a small time interval in order to track the receiver gain in real time.

The transfer function of the receiver is estimated by analyzing the calibration signal that has simultaneously passed through a plurality of receivers to find a gain and phase variation of the array receiver. In the real-time calibration, the signals received through an antenna act as interference to the calibration, the effect of which should be removed during the calibration. Though the effect of received signals can be reduced when the power of the calibration signal is increased, the system performance will be deteriorated because the calibration signal is interference to the antenna signals. Accordingly, a matched filtering based calibration method with a long integration time and a small calibration signal power is frequently used. However, the matched filtering requires exact timing information and the multiplication operations to result in complicated hardware.

SUMMARY OF THE INVENTION

It is an advantage of the present invention to provide a transmitting and receiving apparatus and method in an adaptive array antenna system capable of real-time RF calibration, by which relative gains and phases of the array transmitter and receiver are slowly varied with time to reduce a calibration time interval, thereby reducing interference to the transmit and received signals.

In one aspect of the present invention, a receiving apparatus in an adaptive array antenna system capable of real-time calibration comprises a calibration signal generator generating an RF CW signal; a calibration signal injector injecting the calibration signal output from the calibration signal generator into each channel of the array receiver; an array receiver down-converting the RF calibration signal and the antenna signals to digital complex baseband signals; a calibration controller estimating the transfer function of the array receiver to calculate the calibration coefficients, and controlling the calibration signal power; and an error corrector correcting the different transfer function of the array receiver using the calibration coefficients output from the calibration controller.

The calibration signal injector includes a power divider dividing the calibration signal generated by the calibration signal generator, and a plurality of couplers combining the RF signals received through the array antenna with the calibration signals output from the power divider, respectively, and outputting the combined signals to the array receiver.

The array receiver includes a plurality of down-converters down-converting the RF signals to intermediate frequency band signals; a plurality of variable amplifiers respectively controlling gains of each receive channel; a plurality of analog-to-digital converters respectively sampling the signals output from the variable amplifiers; a plurality of digital I/Q demodulators respectively demodulating the signals sampled by the analog-to-digital converters into complex baseband signals and outputting the complex baseband signals to the error corrector; a power estimator estimating the power of the signals sampled by the analog-to-digital converters; and a gain control value calculator calculating the gain control value of the variable amplifiers on the basis of an error between the mean value of receiving power, calculated by the power estimator, and a predetermined reference value.

The error corrector includes a plurality of complex multipliers that multiply the RF signals output from the array receiver by the calibration coefficients output from the calibration controller, and output the resultant signals to the beam former, respectively.

The calibration controller includes a plurality of mean estimators adding up the plurality of signals output from the array receiver for a predetermined period of time to estimate mean values for the signals, respectively; a calibration coefficient calculator calculating the calibration coefficients for the plurality of paths on the basis of the mean values estimated by the mean estimators and outputting the calibration coefficients to the error corrector; and a calibration signal power controller calculating a calibration signal ratio (CSR) on the basis of the mean values estimated by the plurality of mean estimators, and outputting a control signal to the calibration signal generator for controlling the power of the calibration signal such that the calculated CSR converges on a predetermined reference value.

The calibration signal generator includes an RF CW signal generator generating a RF CW sinusoidal signal, and a variable attenuator controlling the power of the RF CW signal in response to the calibration signal power control signal output from the calibration controller and outputting the CW signal to the calibration signal injector as the calibration signal.

In another aspect of the present invention, a receiving method in an adaptive array antenna system capable of real-time calibration, comprises (a) injecting a calibration signal into each RF receive paths and operating an automatic gain controller; (b) controlling the power of the calibration signal, and determining whether a CSR is within an allowable error range of a specific reference value; (c) estimating the transfer functions of the receiver paths when the CSR is within the allowable error range of the specific reference value; (d) calculating calibration coefficients on the basis of the estimated transfer functions; and (e) correcting errors in the RF signals, received through the array antenna, using the calculated calibration coefficients.

The receiving method further comprises repeating (b), (c), (d), and (e) to update the calibration coefficients and correcting errors in the received signals using the updated calibration coefficients when a period of time corresponding to a specific period of updating the calibration coefficients has passed after (e).

The operation (a) increases the power of the calibration signal in order to estimate the transfer function of the calibration signal.

The operation (d) decreases the power of the calibration signal such that the calibration signal is not generated.

In another aspect of the present invention, a transmitting apparatus in an adaptive array antenna system capable of real-time calibration comprises a calibration signal injector injecting a calibration signal into each path of a plurality of transmit signals output from a baseband beam former; an array transmitter respectively up-converting the baseband transmit signals and the calibration signal to RF analog signals; a transmit signal extractor extracting the plurality of transmit signals, which are output from the array transmitter and transmitted to an array antenna, and adding up the extracted transmit signals; an RF down-converter converting the signal output from the transmit signal extractor to a baseband digital signal; a calibration controller generating the calibration signal to provide it to the calibration signal injector, controlling the calibration signal injector such that the calibration signal is injected into only one path of the transmit signals, estimating a transfer function of the calibration signal from the signal output from the RF down-converter to calculate calibration coefficients for each of the transmit paths, and controlling a gain of the RF down-converter; and an error corrector correcting the different transfer function of the array transmitter using the calibration coefficients output from the calibration controller, respectively.

The transmit signal extractor includes a plurality of couplers extracting the transmit signals output from the array transmitter, and a power divider adding up the transmit signals extracted by the couplers to output the resultant signal to the RF down-converter.

The calibration controller includes a mean estimator adding up the signal output from the RF down-converter for a predetermined period of time, to obtain a mean value; a variance estimator estimating a variance value of the signal output from the RF down-converter; a central processor calculating the calibration coefficients for the plurality of transmit paths on the basis of the mean value estimated by the mean estimator, outputting the calibration coefficients to the error corrector, and calculating a calibration signal ratio (CSR, ratio of the calibration power to a signal power) on the basis of the variance value estimated by the variance estimator and the mean value estimated by the mean estimator, outputting a control signal to RF the down-converter for controlling the power of the calibration signal such that the calculated CSR converges on a predetermined reference value; and a switch operated under the control of the central processor such that the actual calibration signal is provided to only one path of a plurality of calibration signals supplied to the transmit signal extractor.

The calibration signal is a constant in a baseband and corresponding to a RF sinusoidal signal in an RF band.

In another aspect of the present invention, a transmitting method in an adaptive array antenna system capable of real-time calibration comprises (a) operating an automatic gain controller; (b) controlling the power of a calibration signal, and determining whether a CSR is within an allowable error range of a specific reference value; (c) sequentially injecting the calibration signal into a plurality of transmit signals and estimating the transfer functions of the transmitter paths when the CSR is within the allowable error range of the specific reference value; (d) calculating calibration coefficients on the basis of the estimated transfer functions; and (e) correcting errors in the transmitted signals to the array antenna, using the calculated calibration coefficients.

The transmitting method further comprises repeating (a), (b), (c), (d), and (e) to update the calibration coefficients, and correcting errors in the transmit signals using the updated calibration coefficients when a period of time corresponding to a specific period of updating the calibration coefficients has passed after (e).

The operation (d) sets the calibration signal to zero such that the calibration signal is not generated.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
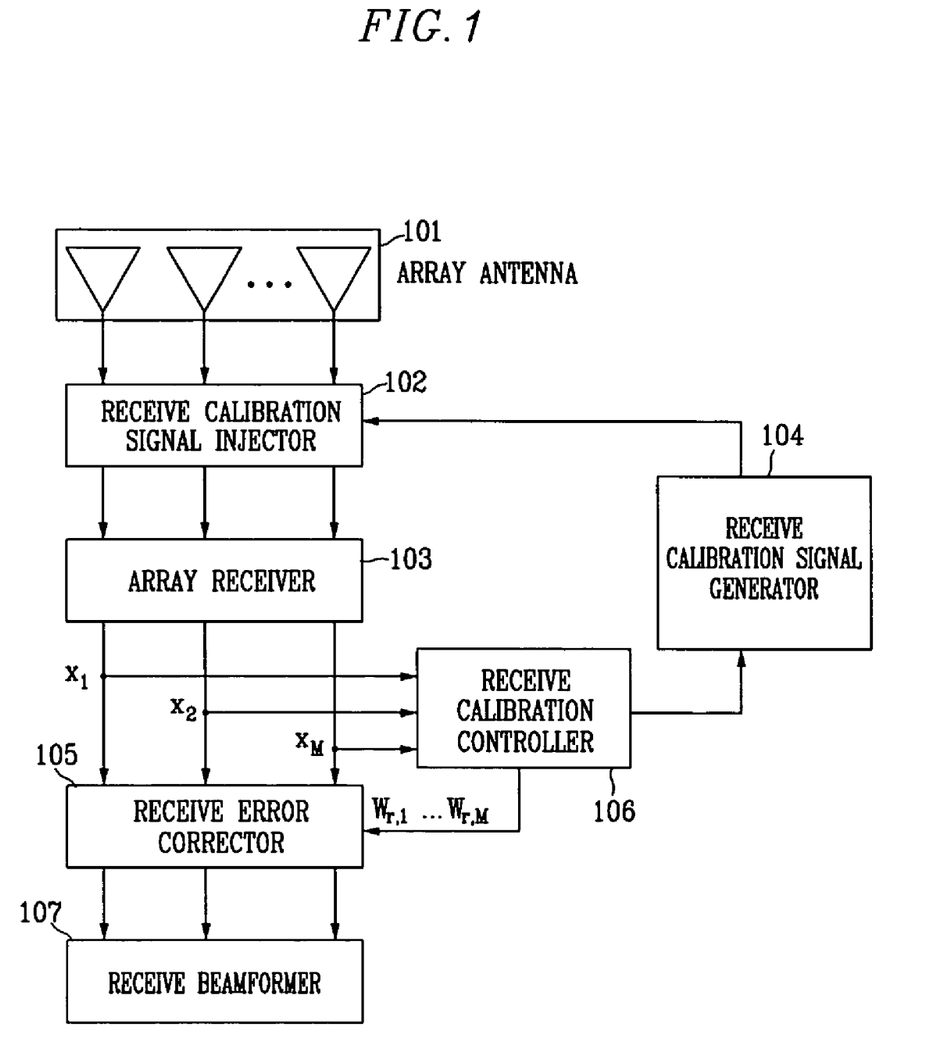
FIG. 1 is a block diagram of an array receiver system capable of real-time calibration according to an embodiment of the present invention.

FIG. 1 is a block diagram of an array receiver system capable of real-time receive calibration according to an embodiment of the present invention. Referring to FIG. 1, the array receiver system includes an array antenna 101, a receive calibration signal injector 102, an array receiver 103, a receive calibration signal generator 104, a receive error corrector 105, a receive calibration controller 106, and a receive beam former 107.

RF signals received through the array antenna 101 have transfer function errors when passing through the array receiver 103. The error corrector 105 calibrates the transfer function errors and transmits them to the beam former 107. The receive calibration signal generator 104 generates an RF calibration signal and injects the signal, through the calibration signal injector 102, into each of the RF signals, which are input from the array antenna 101 to the array receiver 103. The calibration controller 106 estimates a receive transfer function from the calibration signal passed through the array receiver 103 and calculates calibration coefficient using the estimated transfer function and provides the calibration coefficient to the error corrector 105. In addition, the calibration controller 106 provides a control signal to the receive calibration signal generator 104 for controlling the power of the calibration signal injected into the RF signals.

Figure 2:
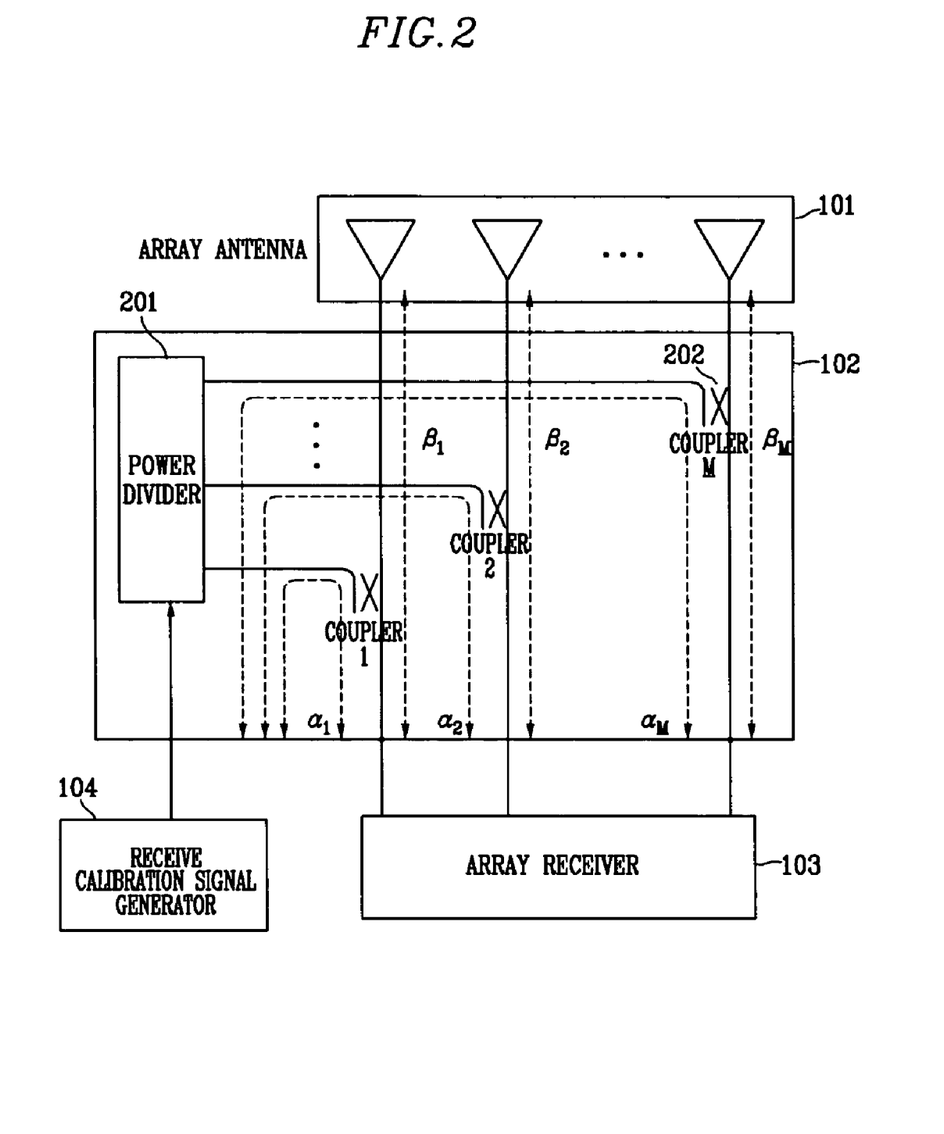
FIG. 2 is a block diagram of the receive calibration signal injector shown in FIG. 1.

FIG. 2 is a block diagram of the calibration signal injector 102 of the array receiver system shown in FIG. 1. As shown in FIG. 2, the calibration signal injector 102 includes a power divider 201 and M couplers 202 (M is a natural number greater than 1).

The calibration signal generated by the receive calibration signal generator 104 passes through the power divider 201 to be divided into M signals, which are then respectively injected, through the M couplers 202, into RF signals of M channels which are output from the array antenna 101, and input to the array receiver 103. In FIG. 2, $\alpha_i$ means a complex transfer function (i corresponds to one of 1 through M) of a path through which the calibration signal is injected into the ith signal, and $\beta_i$ means a complex transfer function of a path from an output terminal of the ith array antenna to an input terminal of the ith array receiver. These transfer functions are measured in advance and used when the calibration coefficients are calculated.

Figure 3:
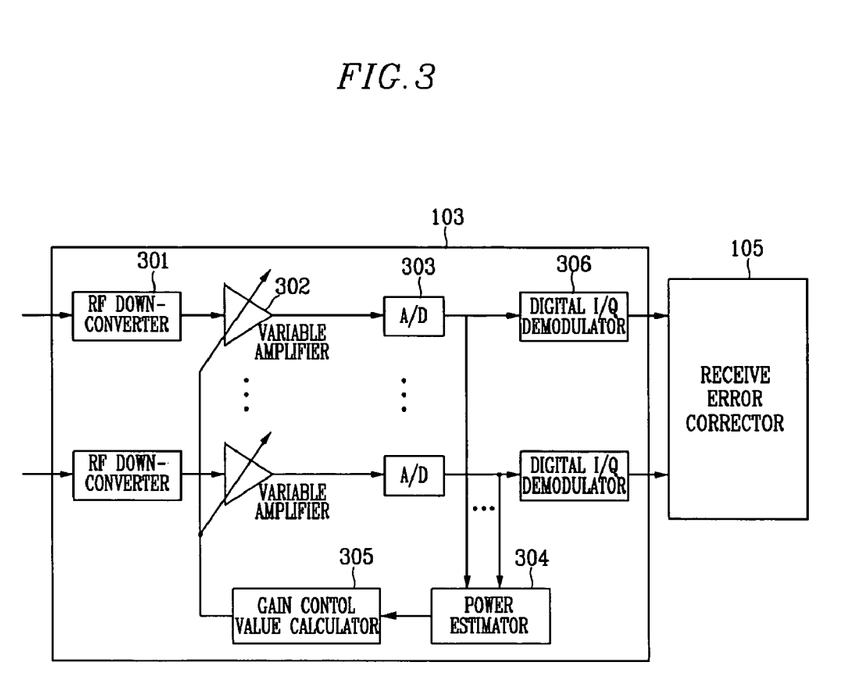
FIG. 3 is a block diagram of the array receiver shown in FIG. 1.

In a multiple antenna receive system such as a conventional diversity system, an automatic gain controller is allocated to each receive channel and independently operated. Each automatic gain controller controls only the receiver gain of a corresponding channel using only a received signal power of the corresponding channel, and a quantization error for each receive channel can be minimized. However, in the case of a smart antenna system that must continuously detect a relative transfer function difference, because a plurality of receiver gains are independently varied, the transfer function should be estimated faster than a receiver gain varying speed. This characteristic may deteriorate the performance of a CDMA smart antenna system in which a calibration signal injected for estimating the transfer function acts as interference to the system. FIG. 3 shows a configuration of the array receiver for solving this problem.

FIG. 3 is a block diagram of the array receiver 103 shown in FIG. 1. As shown in FIG. 3, the array receiver 103 includes M RF down-converters 301, M variable amplifiers 302, M A/D converters 303, M power estimators 304, a gain control value calculator 305, and M digital I/Q demodulators 306.

The M down-converters 301 respectively down-convert the RF signals in which the calibration signal has been injected through the calibration signal injector 102 to IF band signals. The variable amplifiers 302 amplify the IF band signals output from the RF down-converters 301 with variable gains which are controlled by a control signal output from the gain control value calculator 305.

The A/D converters 303 respectively sample the IF band signals output from the variable amplifiers 302 to digital signals. The digital I/Q demodulators 306 respectively convert the IF band signals output from the A/D converters 303 to complex baseband signals and output them to the error corrector 105.

The power estimator 304 obtains a mean value of powers of the respective output signals of the A/D converters 303. The gain control value calculator 305 compares the mean value output from the power estimator 304 with a reference value to obtain an error, filters the error, and converts the resultant value to an analog value to generate a gain control signal of the variable amplifiers 302.

As described above, since gains of all channels of the receivers are controlled using an identical gain control value obtained by averaging powers of all receive channels, relative gains of the receivers become similar. Consequently, the calibration coefficient, which is determined by relative values of transfer functions, is not related to the receiver gains and it is updated in response to a variation only in temperature and humidity. When the updating period increases, the required time for injecting the calibration signal is shortened. This reduces interference in the system.

Figure 4:
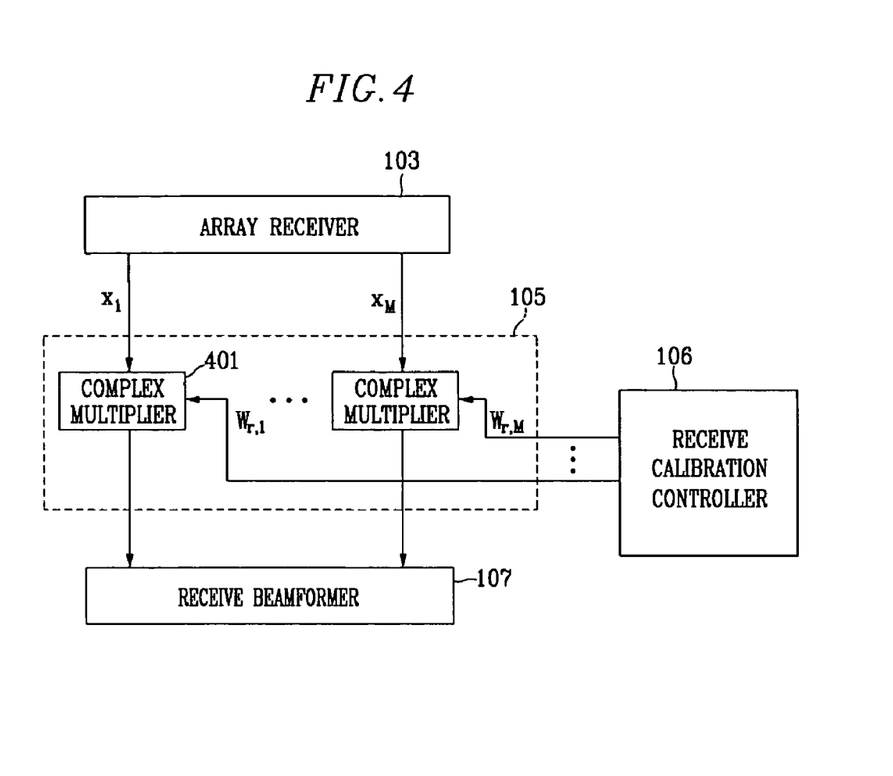
FIG. 4 is a block diagram of the receive error corrector shown in FIG. 1.

FIG. 4 is a block diagram of the error corrector 105 shown in FIG. 1. Referring to FIG. 4, the error corrector 105 includes M complex multipliers 401. Each of the complex multipliers 401 multiplies each of the complex baseband signals output from the array receiver 103 by the calibration coefficient $w_{r,i}$, calculated by the calibration controller 106, and outputs the resultant value to the receive beam former 107.

Figure 5:
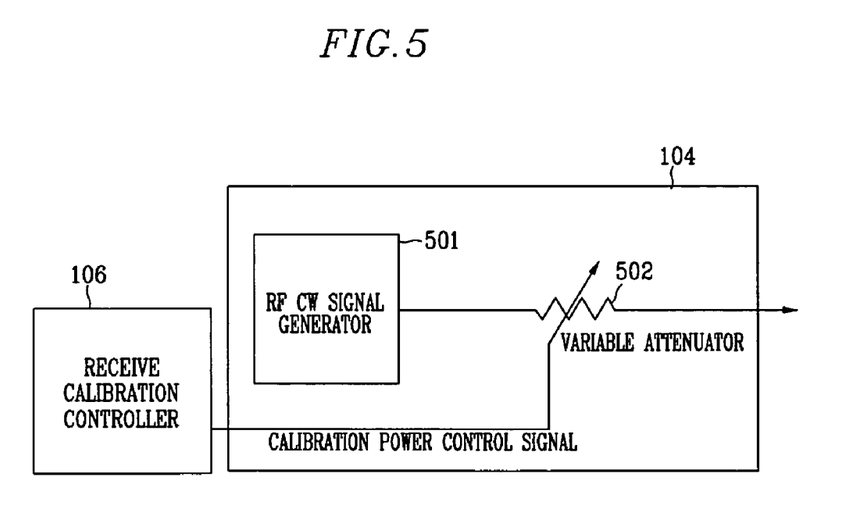
FIG. 5 is a block diagram of the receive calibration signal generator shown in FIG. 1.

FIG. 5 is a block diagram of the receive calibration signal generator 104 shown in FIG. 1. Referring to FIG. 5, the receive calibration signal generator 104 includes an RF continuous wave (CW) signal generator 501 and a variable attenuator 502. The RF CW signal generator 501 generates a CW sinusoidal signal of a corresponding RF frequency, and the variable attenuator 502 controls the power of the CW signal. The attenuation value of the variable attenuator 502 is determined by the calibration power control signal output from the calibration controller 106.

To estimate the calibration coefficient $w_{r,i}$, a transfer function of a receiver must be previously estimated. In the embodiment of the present invention, the transfer function is estimated by analyzing the output signals of the array receiver 103, which is described below in detail.

The output signals of the array receiver 103 can be represented as follows.

$$x_i(n) = \alpha_i h_i c(nT - \tau) + s_i(n) + n_i(n) \quad \text{[Equation 1]}$$

Here, $\alpha_i$ is a transfer function of a calibration signal for the ith path in the calibration signal injector 102, as shown in FIG. 2, and $h_i$ means a portion of a transfer function for the entire ith path of the calibration signal, exclusive of $\alpha_i$. In addition, $c(nT-\tau)$ denotes a value obtained by sampling a calibration reference signal in a baseband, which has been delayed by $\tau$, at a sampling interval T. Furthermore, $s_i(n)$ and $n_i(n)$ are values obtained by sampling a receive signal and a noise with respect to the ith channel at a sampling interval T, respectively.

In Equation 1, since a receive transfer function is included in $h_i$, a matched filtering process represented by Equation 2 is required in order to obtain the receive transfer function.

$$\widehat{a_i h_i} = \frac{1}{N} \sum_{n=1}^{N} [(x_i(n) c(nT - \hat{\tau})] \quad \text{[Equation 2]}$$

To carry out the matched filtering process represented by Equation 2, a time delay $\hat{\tau}$ of the system should be estimated first, and then N complex multiplications should be executed. This increases the quantity of calculations and complicates hardware implementation. To solve this problem, the present invention uses a sinusoidal signal of a single frequency as the RF calibration signal to make $c(n)$ a constant. Since $c(n)$ is a constant, there is no need to estimate the time delay $\hat{\tau}$ of the system. Thus, Equation 2 can be simplified into the following Equation 3.

$$m_i = \frac{1}{N} \sum_{n=1}^{N} x_i(n) \quad \text{[Equation 3]}$$

Figure 6:
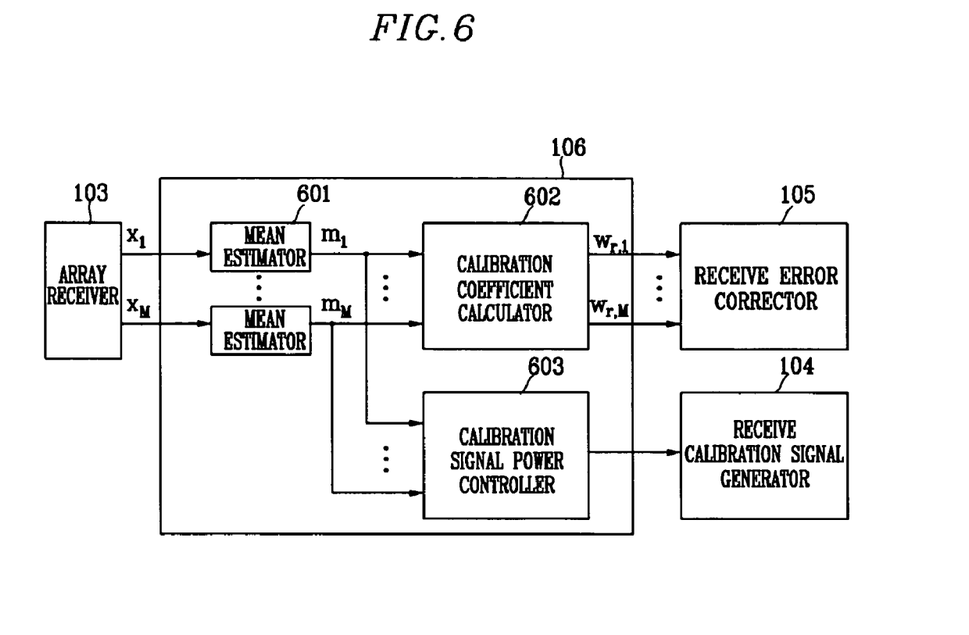
FIG. 6 is a block diagram of the receive calibration controller shown in FIG. 1.

FIG. 6 is a block diagram of the calibration controller 106 shown in FIG. 1. Referring to FIG. 6, the calibration controller 106 includes M mean estimators 601, a calibration coefficient calculator 602, and a calibration signal power controller 603.

The calibration controller 106 calculates the calibration coefficient and controls the power of the calibration signal. Each of the mean estimators 601 adds up received data output from the array receiver 103 to estimate a mean value, as shown in Equation 3. The calibration controller 106 averages in time the mean values obtained by the mean estimators 601 to estimate a transfer function. This is for the purpose of reducing a mean estimation error.

$$\gamma_i = (1-\rho)\gamma_{i-1} + \rho m_i \quad \text{[Equation 4]}$$

Here, $\rho$ is a constant smaller than 1, and $\gamma_i$ is a transfer function of the ith path through which the calibration signal is injected, so that it has a difference from transfer functions of paths of signals received through the array antenna 101. Thus, the receive calibration coefficient $w_{r,i}$ in consideration of the difference is obtained as the following Equation 5.

$$w_{r,i} = \left(\frac{\beta_i}{\alpha_i} \gamma_i\right)^{-1} \quad \text{[Equation 5]}$$

The operations represented by Equations 4 and 5 are processed by the calibration coefficient calculator 602.

To control the power of the calibration signal, the calibration signal power controller 603 obtains a calibration signal ratio (CSR) as follows.

$$\eta = \frac{\sigma_s^2}{\sigma_x^2 - \sigma_s^2} \quad \text{[Equation 6]}$$

Here, $$\sigma_x^2 = \frac{1}{M} \sum_{i=1}^{M} E[x_i^2],$$

which is a variance of the received signal, and $$\sigma_s^2 = \left[\frac{1}{M} \sum_{i=1}^{M} m_i\right]^2,$$

which is a variance of the calibration signal.

The calibration signal power controller 603 continuously controls the variable attenuator 502 of the receive calibration signal generator 104 such that $\eta$ converges on a predetermined reference value before or during the transfer function estimation.

Figure 7:
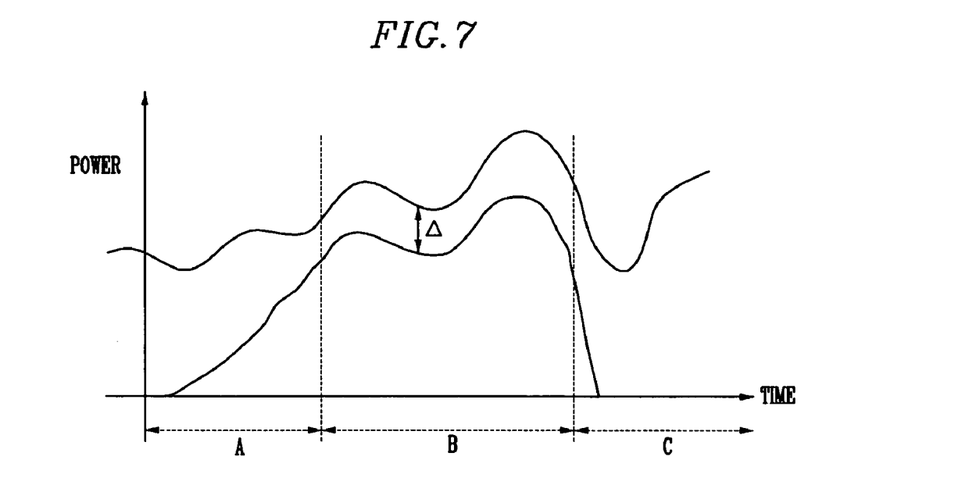
FIG. 7 is a diagram for explaining a method of controlling a calibration signal power and a method of estimating a transfer function in the array receiver system capable of real-time calibration according to an embodiment of the present invention.

FIG. 7 is a diagram for explaining a method of controlling a calibration signal power and a method of estimating a transfer function in the array receiver system capable of real-time calibration according to an embodiment of the present invention.

Referring to FIG. 7, the calibration power control is carried out through three time zones A, B, and C. The time zone A increases the calibration signal power in order to estimate a transfer function. In the time zone A, the calibration signal power gradually increases from 0 to a level having a difference A from a received signal power. The time zone B starts to average received data in order to estimate a transfer function. In the time zone B, a difference between the received signal power and the calibration signal power is maintained at Δ. The time zone C reduces the calibration signal power after the completion of the averaging process for the estimation of a transfer function.

Figure 8:
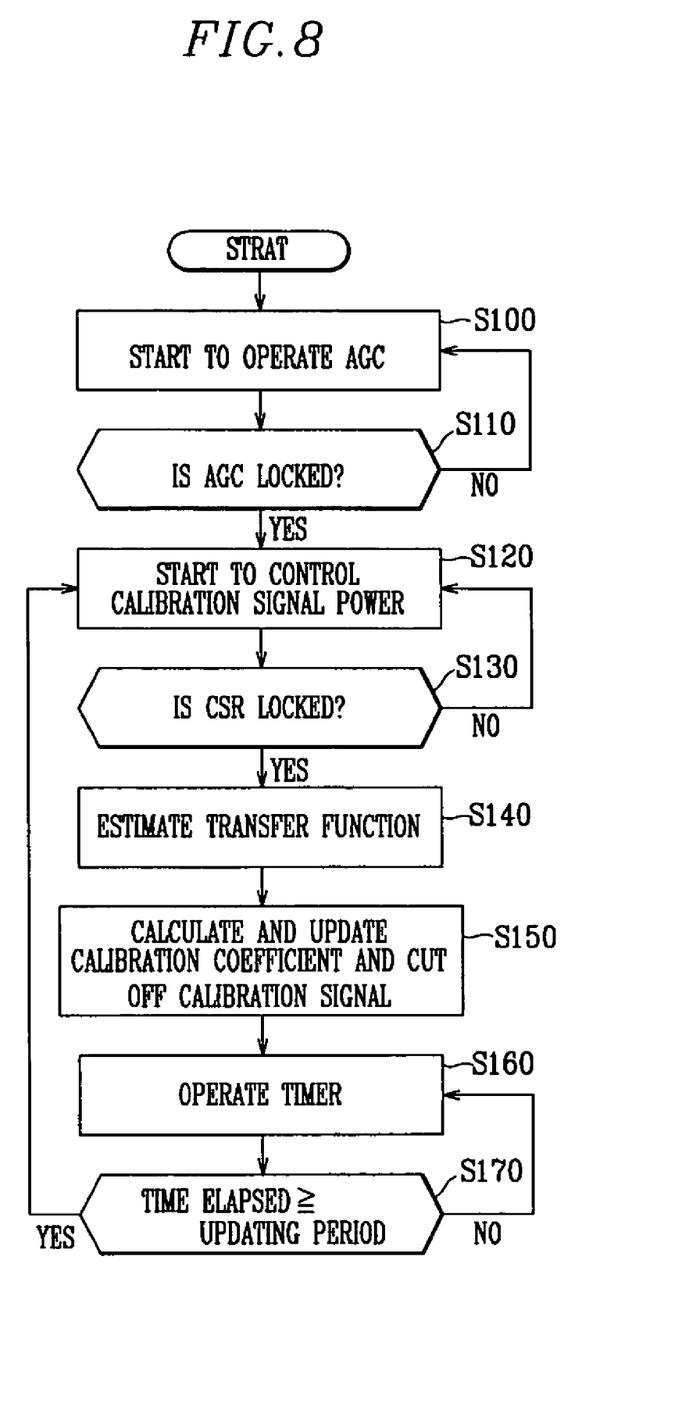
FIG. 8 is a flow chart showing a real-time array receiver calibration method according to an embodiment of the present invention.

FIG. 8 is a flow chart showing a real-time array receiver calibration method in an adaptive array antenna system according to an embodiment of the present invention. Referring to FIG. 8, when the system is initially turned on, the receive calibration signal generator 104 generates the calibration signal and injects it, through the calibration signal injector 102, into each of received RF signals, which are output from the array antenna 101 to be input to the array receiver 103, and operates an automatic gain controller in step S100. Here, the power of the calibration signal is within a range of the input signals of the receiver.

When the automatic gain controller reaches a steady state to be stabilized in step S110, the calibration controller 106 starts controlling the power of the calibration signal in step S120. When a difference between the CSR and a reference value is within an allowable error range in step S130, the calibration controller 106 starts estimating a transfer function in step S140. At this time, the calibration controller 106 continuously controls the power of the calibration signal such that the power of the calibration signal can be varied along with a received signal power of the antenna.

Upon the completion of the estimation of transfer function, the calibration controller 106 cuts off the calibration signal and calculates the calibration coefficient $w_{r,i}$ to transmit it to the error corrector 105 in step S150. Then, the calibration controller 106 operates an internal timer (not shown) in step S160. When a period of time corresponding to an updating period of the calibration coefficient has passed in step S170, the calibration controller 106 repeats the aforementioned operations of controlling the power of the calibration signal and updating the calibration coefficient S120 through S150.

Figure 9:
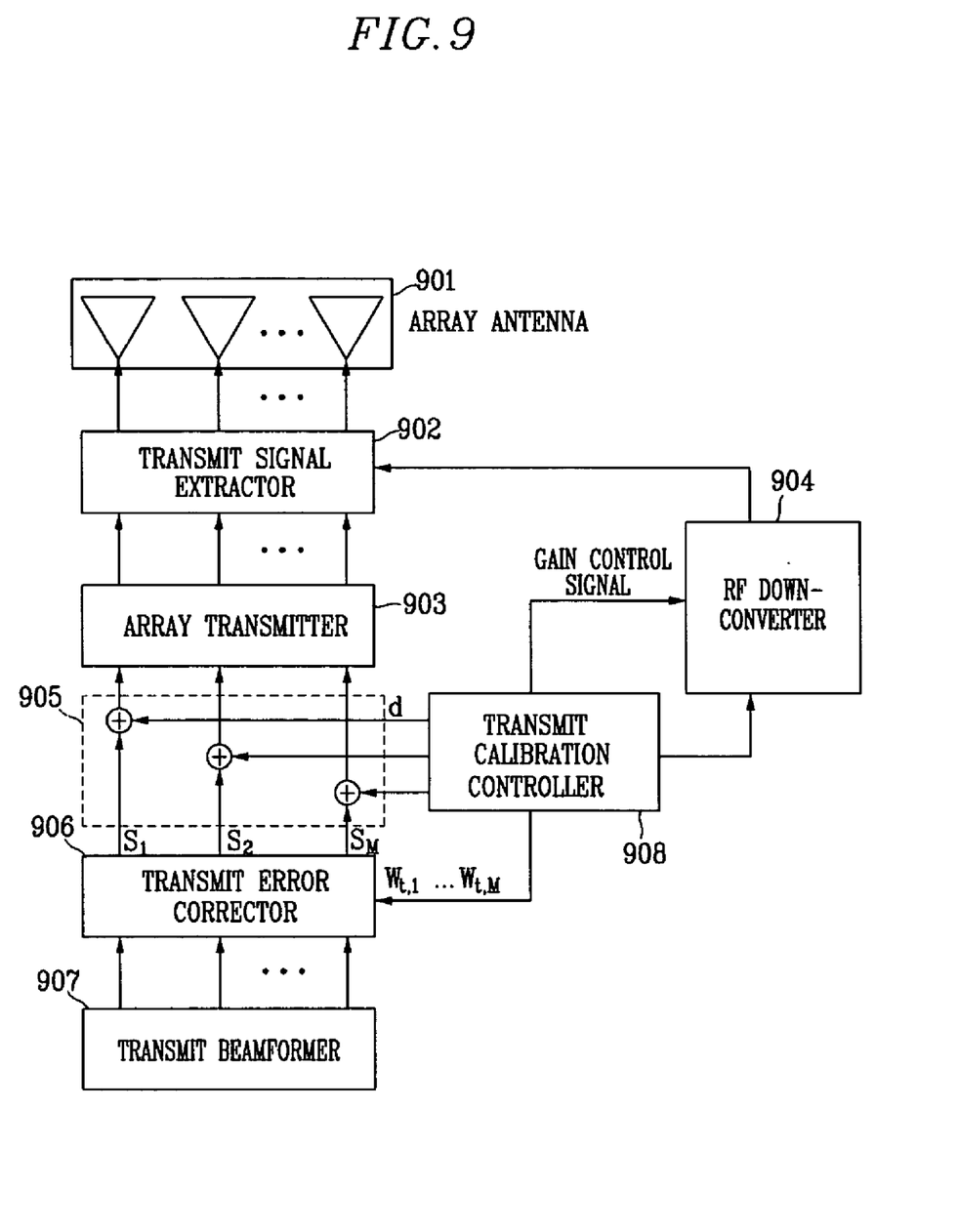
FIG. 9 is a block diagram of an array transmitter system capable of real-time calibration according to an embodiment of the present invention.

FIG. 9 is a block diagram of an array transmitter system capable of real-time transmit calibration according to an embodiment of the present invention. Referring to FIG. 9, the array transmitter system includes an array antenna 901, a transmit signal extractor 902, an array transmitter 903, an RF down-converter 904, a transmit calibration signal injector 905, a transmit error corrector 906, a transmit beam former 907, and a transmit calibration controller 908.

The transmit error corrector 906 multiplies each of a plurality of transmit signals, which are output from the beam former 907, by a transmit calibration coefficient $w_{t,i}$ for each antenna. The calibration controller 908 injects a transmit calibration signal, through the calibration signal injector 105, into each of baseband transmit signals, which are output from the transmit error corrector 906 to be input to the array transmitter 903. Here, the calibration signal is a constant in a baseband and it corresponds to a sinusoidal signal of a corresponding RF frequency in an RF band.

The array transmitter 903 converts the output signals of the transmit calibration signal injector 905 to analog signals, and then up-converts them to RF signals. The signal extractor 902 transmits the up-converted signals through the array antenna 901, respectively. The structure of the signal extractor 902 is similar to the structure of the receive calibration signal injector 102 of the array receiver system, shown in FIG. 2. The signal extractor 902 extracts RF transmit signals of each transmit channels through couplers (not shown), and adds up the extracted signals using a power divider (not shown) to output the resultant signal to the RF down-converter 904.

The RF down-converter 904 converts the transmit signal output extracted from the signal extractor 902 to a baseband digital signal, and outputs the baseband digital signal to the calibration controller 908. Here, since the power of the transmit signal can be varied, the gain of the RF down-converter 904 must be variable.

As described above, a gain control signal for the RF down-converter 904 is calculated by the calibration controller 908 using the variance of a digital signal output from the RF down-converter 904.

The calibration controller 908 sequentially measures transfer functions of each channel of the transmitters and estimates the calibration coefficient $w_{t,i}$ using the measured transfer functions, and provides the coefficient to the transmit error corrector 906. The calibration controller 908 sets the power of the calibration signal to zero when it finishes the estimation of the transfer functions.

Figure 10:
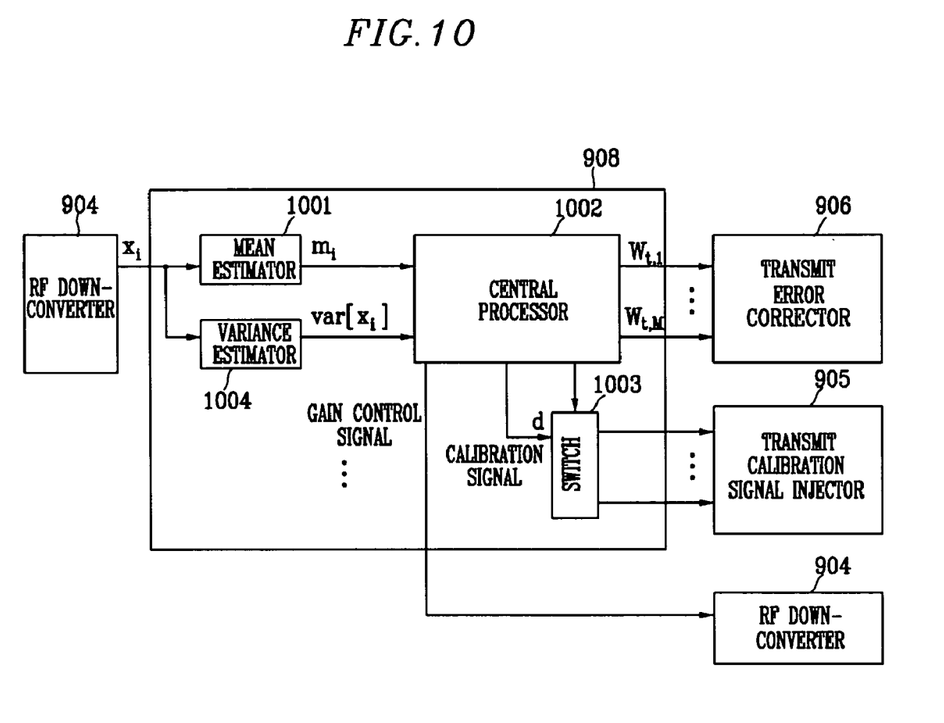
FIG. 10 is a block diagram of the transmit calibration controller shown in FIG. 9.

FIG. 10 is a block diagram of the transmit calibration controller 908 shown in FIG. 9. Referring to FIG. 10, the calibration controller 908 includes a mean estimator 1001, a variance estimator 1004, a central processor 1002, and a switch 1003.

In FIG. 10, $x_i$ means the output signal of the RF down-converter 904 when the calibration signal d (d is a constant) is injected into only the ith transmit channel with the input of 0 to the other channels. $x_i$ can be represented by Equation 7.

$$x_i(n) = \alpha_i h_i(d + s_i(n)) + n_i(n) \quad \text{[Equation 7]}$$

Here, $\alpha_i$ is a transfer function of a calibration signal for the ith path in the transmit signal extractor 902, and $h_i$ means a portion of a transfer function for the entire i th path of the calibration signal, exclusive of $\alpha_i$, and d is a baseband calibration signal. In addition, $s_i(n)$ is a transmit signal for the ith channel, and $n_i(n)$ includes a thermal noise due to the RF down-converter 904 and a noise component caused by transmit signals $s_j(j \neq i)$ of other channels.

The mean estimator 1001 obtains a mean value of the output signal $x_i$ of the RF down-converter 904 as follows.

$$m_i = \frac{1}{N} \sum_{n=1}^{N} x_i(n) \cong \alpha_i h_i d \quad \text{[Equation 8]}$$

The central processor 1002 averages the mean value obtained by the mean estimator 1001 using Equation 9 so as to reduce an estimation error.

$$\gamma_i = (1-\rho)\gamma_{i-1} + \rho m_i \quad \text{[Equation 9]}$$

Here, $\rho$ is a constant smaller than 1, and $\gamma_i$ is a transfer function of the ith path of the calibration signal so that it has a difference from transfer functions of paths of signals transmitted to the array antenna 901. Thus, the transmit calibration coefficient in consideration of the difference is obtained as follows.

$$w_{t,i} = \left(\frac{\beta_i}{\alpha_i}\gamma_i\right)^{-1} \quad \text{[Equation 10]}$$

The operations represented by Equations 9 and 10 are processed by the central processor 1002.

The calibration controller 908 controls the gain of the RF down-converter 904. Since the power of a transmit signal of a base station is varied, the gain of the RF down-converter 904 also must be changed. Accordingly, the central processor 1002 sets the power of the calibration signal injected into all of transmit channels to zero, and then reads a variance var[$x_i$] of the output signal of the RF down-converter 904, which is estimated by the variance estimator 1004. Subsequently, the central processor 1002 subtracts the variance var[$x_i$] from a reference value to obtain an error, and controls the gain of the RF down-converter 904 using a signal obtained by filtering the error. When the variance var[$x_i$] is within an allowable error range, the central processor 1002 fixes the gain until the estimation of transfer functions of the transmit channels is completed.

In the meantime, though the accuracy of the transfer function estimation becomes high when the power of the calibration signal is high, a high power calibration signal acts as interference against transmit signals. Thus, it is important to appropriately control the power of the calibration signal. The central processor 1002 obtains a CSR (calibration signal ratio, ratio of the calibration signal power to the transmit signal power) and compares the CSR with a reference value to obtain an error. And then, the central processor 1002 filters the error to remove a noise component, and then controls the power of the calibration signal on the basis of the filtered value. This operation is represented by the following Equation 11.

First, the central processor 1002 injects the calibration signal into the ith transmit channel and obtains the CSR, $\eta$, using output values of the mean estimator 1001 and the variance estimator 1004, as represented by Equation 11. Here, ii is selected from one of M transmit channels.

$$\eta = \frac{m_i^2}{\text{var}[x_i] - m_i^2} \qquad \text{[Equation 11]}$$

Since a transfer function of a transmitter is hardly varied with time, N can be increased in Equation 8. Thus, even when the calibration signal power $m_i^2$ is much smaller than var[$x_i$], accuracy of the transfer function estimation can be improved. Accordingly, Equation 11 can be approximated to Equation 12.

$$\eta = \frac{m_i^2}{\text{var}[x_i] - m_i^2} \cong \zeta m_i^2, \quad \zeta = \frac{1}{\text{var}[x_i]} \qquad \text{[Equation 12]}$$

Since the gain of the RF down-converter 904 is fixed while the power of the calibration signal is controlled, $\zeta$ is a constant. The central processor 1002 can determine the calibration signal power through Equation 13 using a predetermined reference CSR, $\eta_{ref}$, and the measured CSR, $\eta$, actually obtained in real time using Equation 12.

$$v=v+\mu(\eta_{ref}-\eta)$$

$$d=f(v) \qquad \text{[Equation 13]}$$

Here, $\mu$ is a time constant of a calibration power control loop, and $v$ is an argument of a function $f$ that determines the calibration signal value d and it is recursively updated. When the measured $\eta$ is smaller than the reference value, $v$ is increased. Thus, the calibration signal power is increased only when $f$ is a monotonic increasing function.

In the meantime, the switch 1003 is operated, under the control of the central processor 1002, such that the calibration signal d is provided to only one of M calibration signals to the transmit calibration signal injector 905.

Figure 11:
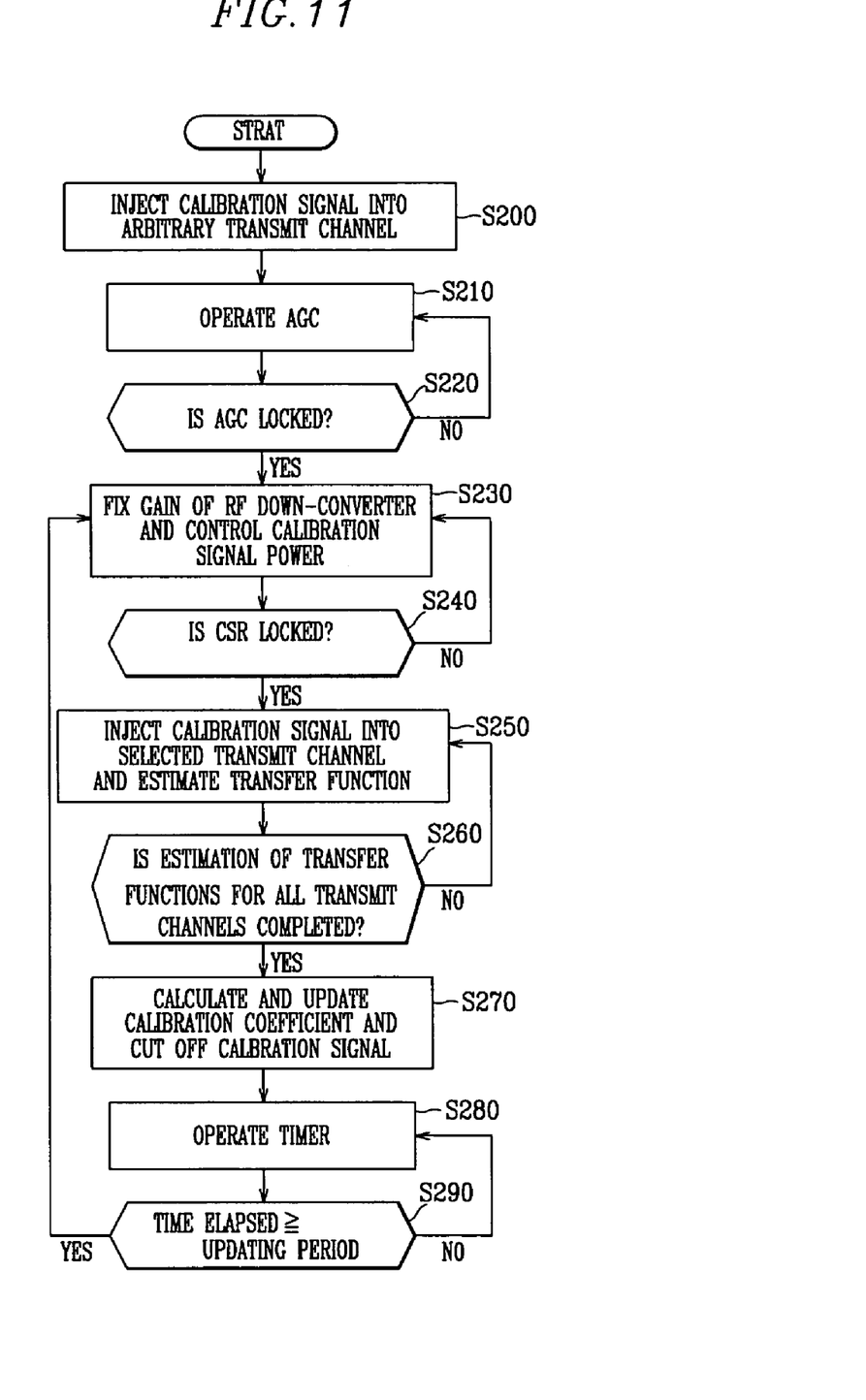
FIG. 11 is a flow chart showing a real-time array transmitter calibration method according to an embodiment of the present invention.

FIG. 11 is a flowchart showing a real-time array transmitter calibration method in an adaptive array antenna system according to an embodiment of the present invention. Referring to FIG. 11, when the system is initially turned on, since there is no signal output from the beam former 907, the calibration controller 908 injects the calibration signal to an arbitrary transmit channel in step S200, and operates the automatic gain controller in step S210. Then, the calibration controller 908 controls the gain of the RF down-converter 904 using the calibration signal. When the automatic gain controller is locked in step S220, the calibration controller 908 fixes the gain of the RF down-converter 904 and starts to control the power of the calibration signal in step S230.

When a difference between the calibration signal power and a reference value is within an allowable error range, which means that CSR is locked (S240), the calibration controller 908 injects the calibration signal to each of the transmit channels sequentially and estimates transfer functions of the transmit channels in step S250.

When the estimation of the transfer functions of all the transmit channels has been completed in step S260, the calibration controller 908 sets the calibration signal value d to zero to cut off the calibration signal, and calculates the transmit calibration coefficient to output it to the transmit error corrector 906 in step S270. Then, the calibration controller 908 operates an internal timer (not shown) in step S280. When a period of time corresponding to an updating period of the calibration coefficient has been passed in step S290, the calibration controller 908 repeats the aforementioned operations S210 through S270 for calculating a new calibration coefficient.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, gains of receivers of the array receiver system are commonly controlled using an identical gain control signal so that a calibration coefficient updating period can be increased. This reduces interference in the system, which is caused by the calibration signal. Furthermore, since a CW signal with a single RF frequency is used as the receive calibration signal, hardware implementation required for estimating transfer functions of the receivers can be simplified. Moreover, a constant in a baseband is used as the transmit calibration signal so that hardware implementation for transmit calibration can be also simplified.

What is claimed is:

1. A receiving apparatus in an adaptive array antenna system capable of real-time calibration, comprising:
    a calibration signal generator generating an RF CW (radio frequency continuous wave) signal to output it as a calibration signal;
    a calibration signal injector injecting the calibration signal output from the calibration signal generator into each of RF signals of a plurality of paths received through an array antenna;
    an array receiver down-converting the RF signals output from the calibration signal injector to demodulate them to digital signals;
    a calibration controller estimating a transfer function of the injected calibration signal from each of the output signals of the array receiver to calculate calibration coefficients for the plurality of paths, and outputting a signal for controlling calibration signal power of the calibration signal generated by the calibration signal generator, wherein the calibration controller controls the calibration signal power such that a calibration signal ratio (CSR, which is defined as a ratio of the calibration signal power to received RF signal power) is within an allowable range of a reference value; and an error corrector respectively correcting errors in the RF signals from the baseband output of the array receiver, using the calibration coefficients output from the calibration controller and outputting the corrected signal to beam former to form a receive beam.

2. The receiving apparatus as claimed in claim 1, wherein the calibration signal injector comprises:

a power divider dividing the calibration signal generated by the calibration signal generator into a plurality of calibration signals respectively corresponding to the plurality of paths; and a plurality of couplers combining the RF signals received through the array antenna with the plurality of calibration signals output from the power divider respectively, and outputting the combined signals to the array receiver.

3. The receiving apparatus as claimed in claim 1, wherein the array receiver comprises:

a plurality of down-converters respectively down-converting the RF signals into which the calibration signals have been respectively injected, to intermediate frequency band signals;

a plurality of variable amplifiers respectively controlling gains of the signals output from the down-converters;

a plurality of analog-to-digital converters respectively sampling the signals output from the variable amplifiers;

a plurality of digital demodulators respectively demodulating the signals sampled by the analog-to-digital converters into complex baseband signals and outputting the complex baseband signals to the error corrector; a power estimator calculating a mean value of powers of the signals sampled by the analog-to-digital converters; and a gain control value calculator controlling the gain of the variable amplifiers using a gain control value that is calculated on the basis of a difference between the mean value of receiving power, calculated by the power estimator, and a predetermined reference value.

4. The receiving apparatus as claimed in claim 1, wherein the error corrector includes a plurality of complex multipliers that multiply the baseband signals output from the array receiver by the calibration coefficients output from the calibration controller, and output the resultant signals to the beam former, respectively.

5. The receiving apparatus as claimed in claim 1, wherein the calibration controller comprises:

a plurality of mean estimators adding up the plurality of signals output from the array receiver for a predetermined period of time to estimate mean values for the signals, respectively;

a calibration coefficient calculator calculating the calibration coefficients for the plurality of paths on the basis of the mean values estimated by the mean estimators and outputting the calibration coefficients to the error corrector; and a calibration signal power controller calculating a calibration signal ratio (CSR) on the basis of the mean values estimated by the plurality of mean estimators, and outputting the signal for controlling the power of the calibration signal to the calibration signal generator such that the calculated CSR ratio converges on a predetermined reference value.

6. The receiving apparatus as claimed in claim 1, wherein the calibration signal generator comprises:

an RF CW signal generator generating a CW sinusoidal signal in RF band; and a variable attenuator controlling the power of the RF CW signal, generated by the RF CW signal generator, in response to the power control signal output from the calibration controller and outputting the CW signal to the calibration signal injector as the calibration signal.

7. A receiving method in an adaptive array antenna system capable of real-time calibration, comprising:

(a) injecting a calibration signal to each of RF signals of a plurality of paths received through an array antenna and operating an automatic gain controller for each of the RF signals;

(b) controlling calibration signal power of the calibration signal; such that a calibration signal ratio (CSR, which is defined as a ratio of the calibration signal power to received RF signal power) is within an allowable error range of a specific reference values;

(c) estimating a transfer function of the calibration signal for each of the plurality of paths when the CSR is within the allowable error range of the specific reference value;

(d) calculating calibration coefficients on the basis of the estimated transfer functions for the plurality of paths, respectively; and (e) correcting errors in the received signals of the array antenna system, using the calculated calibration coefficients for the plurality of paths.

8. The receiving method as claimed in claim 7, further comprising repeating (b), (c), (d), and (e) to update the calibration coefficients and correct errors in the received signals using the updated calibration coefficients, when a period of time corresponding to a specific period of updating the calibration coefficients has passed after (e).

9. The receiving method as claimed in claim 7, wherein (a) further comprises:

increasing the calibration signal power in order to estimate the transfer function of the calibration signal.

10. The receiving method as claimed in claim 7, wherein (d) further comprises:

decreasing the calibration signal power such that the calibration signal is not generated.

11. A transmitting apparatus in an adaptive array antenna system capable of real-time calibration, comprising:

a calibration signal injector injecting a calibration signal into each of a plurality of transmit signals output from a beam former that forms baseband transmit signals;

an array transmitter respectively up-converting the plurality of transmit signals output from the calibration signal injector to RF analog signals;

a transmit signal extractor extracting the plurality of RF transmit signals, which are output from the array transmitter and transmitted to an array antenna, and adding up the extracted transmit signals;

a down-converter converting the RF signal output from the transmit signal extractor to a baseband digital signal;

a calibration controller generating the calibration signal to provide it to the calibration signal injector, controlling the calibration signal injector such that the calibration signal is injected into only one of the plurality of transmit signals, estimating a transfer function of the calibration signal using the signal output from the down-converter to calculate calibration coefficients for the transmit paths through which the calibration signal is injected, and outputting a signal for controlling the gain of the down-converter, wherein the calibration controller controls calibration signal power of the calibration signal such that a calibration signal ratio (CSR, which is defined as a ratio of the calibration signal power to transmit signal power) is within an allowable range of a reference value; and an error corrector respectively correcting errors in the transmit signals, output from the beam former to the calibration signal injector, using the calibration coefficients output from the calibration controller.

12. The transmitting apparatus as claimed in claim 11, wherein the transmit signal extractor comprises:

a plurality of couplers extracting the plurality of transmit signals output from the array transmitter to the array antenna; and a power divider adding up the transmit signals extracted by the couplers to output the resultant signal to the down-converter.

13. The transmitting apparatus as claimed in claim 11, wherein the calibration controller comprises:

a mean estimator adding up the signal output from the down-converter for a predetermined period of time, to obtain a mean value;

a variance estimator estimating a variance value of the signal output from the down-converter;

a central processor calculating the calibration coefficients for the transmission paths of the injected calibration signal on the basis of the mean value obtained by the mean estimator and outputting the calibration coefficients to the error corrector, and calculating the calibration signal ratio (CSR) on the basis of the mean value obtained by the mean estimator and the variance value estimated by the variance estimator, and outputting a signal for controlling the power of the calibration signal to the down-converter such that the calculated CSR converges to a specific reference value; and a switch operated under the control of the central processor such that the actual calibration signal is provided to only one of a plurality of calibration signal paths to the calibration signal injector.

14. The transmitting apparatus as claimed in claim 11, wherein the calibration signal is a constant in a base band, which corresponds to a sinusoidal signal of a single frequency in an RF band.

15. A transmitting method in an adaptive array antenna system capable of real-time calibration, comprising:

(a) operating an automatic gain controller for a plurality of transmit signals;

(b) controlling calibration signal power of a calibration signal such that a calibration signal ratio (CSR, which is defined as a ratio of the calibration signal power to transmit signal power) is within an allowable error range of a specific reference value;

(c) sequentially injecting the calibration signal into a plurality of transmit signals and estimating transfer functions of paths of the transmit signals when the CSR is within the allowable error range of the specific reference value;

(d) calculating calibration coefficients on the basis of the estimated transfer functions for the plurality of paths, respectively; and (e) correcting errors in the transmit signals of the array antenna system using the calculated calibration coefficients for the plurality of paths.

16. The transmitting method as claimed in claim 15, further comprising repeating (a), (b), (c), (d), and (e) to update the calibration coefficients and correct errors in the transmit signals using the updated calibration coefficients, when a period of time corresponding to a specific period of updating the calibration coefficients has passed after (e).

17. The transmitting method as claimed in claim 15, wherein (d) has a control operation to set the calibration signal to zero such that the calibration signal is not generated.

* * * * *